United States Patent Office
3,260,325
Patented July 12, 1966

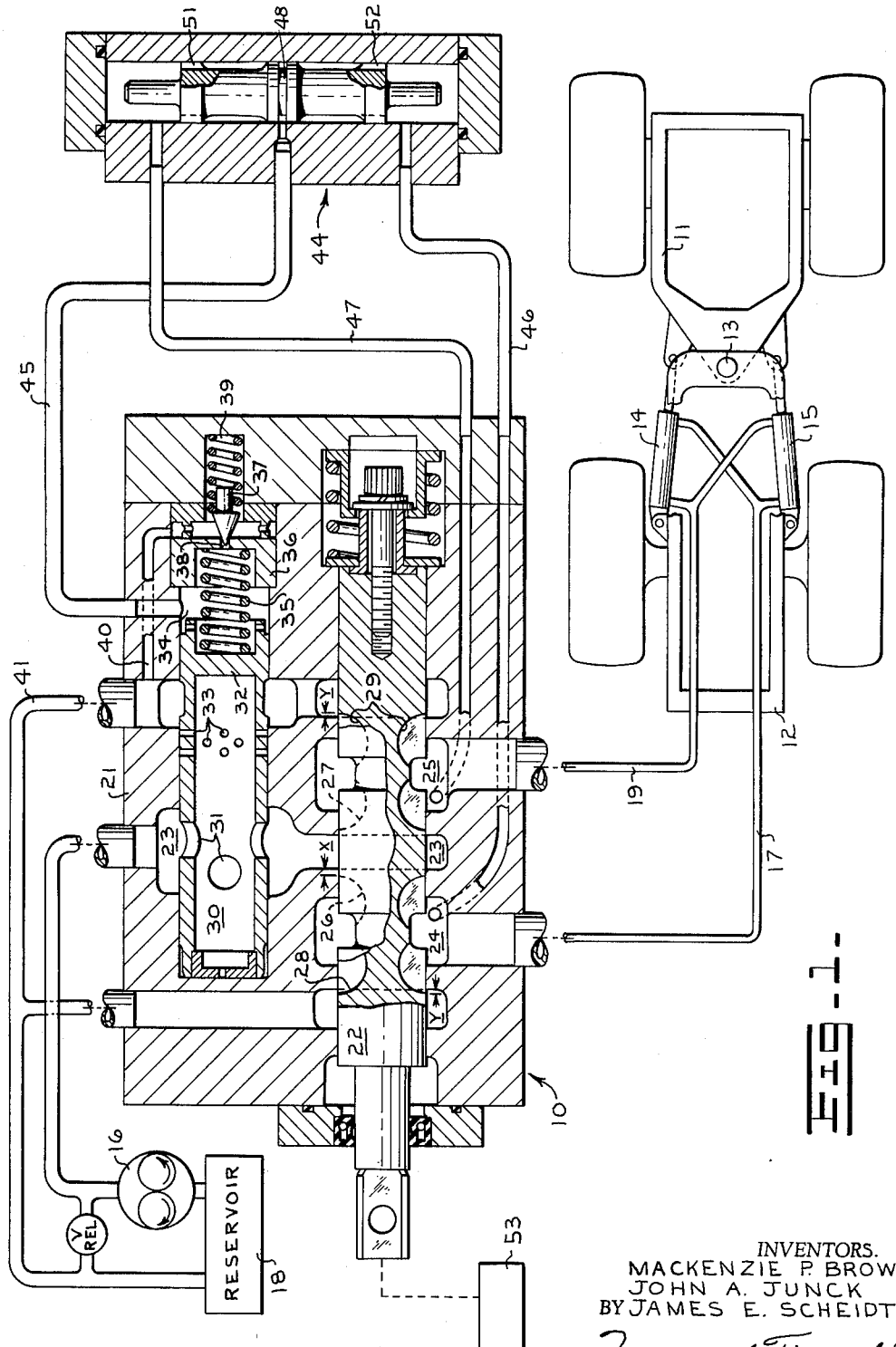

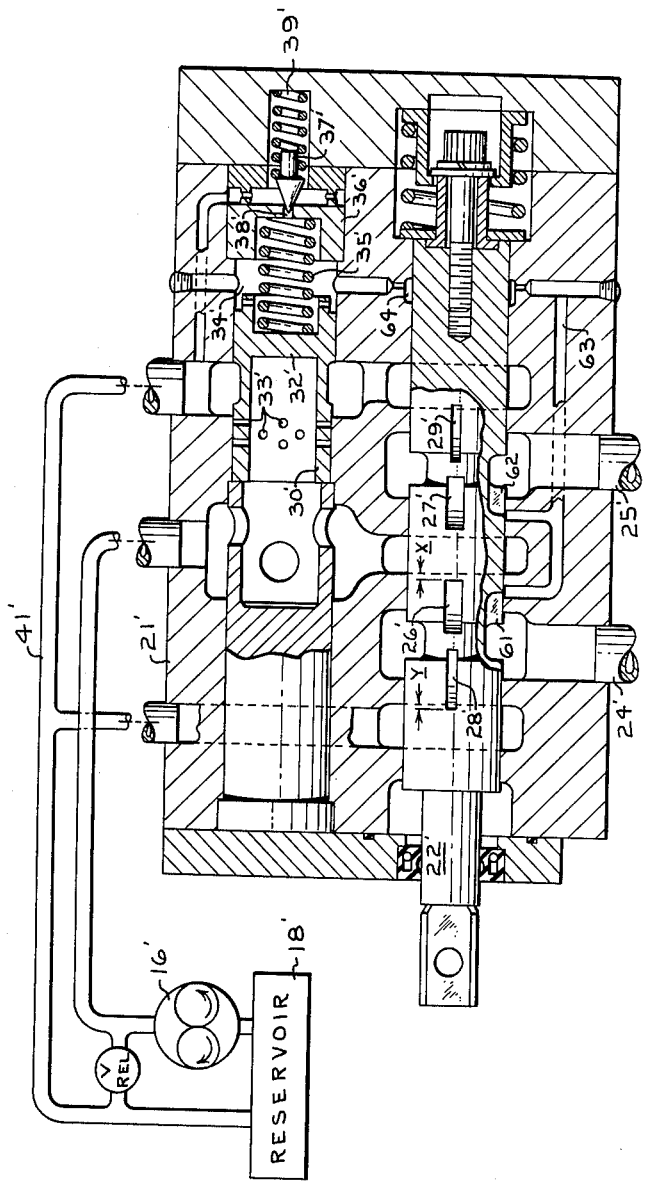

3,260,325
HYDRAULIC STEERING SYSTEM
Mackenzie P. Brown, New Lenox, and John A. Junck and James E. Scheidt, Joliet, Ill., assignors to Caterpillar Tractor Co., Peoria, Ill., a corporation of California
Filed Aug. 19, 1963, Ser. No. 302,897
14 Claims. (Cl. 180—79.2)

This invention relates to a hydraulic steering system and more particularly relates to a hydraulic steering system for articulated vehicles.

Many steering systems have been proposed for articulated vehicles and the like. The most common systems comprise hydraulic jacks arranged between two pivotally connected frames of a vehicle. Fluid pressure is selectively directed to the jacks by a control valve so as to steer the vehicle during various phases of operation. In general, it is desired to effect an expeditious and efficient steering of the vehicle by precisely controlling the fluid flow rate to the jacks. It is further desirable to bypass pumped fluid through the valve and to a reservoir during selected phases of operation, such as when the valve is in neutral position. Many rather complicated steering systems have been proposed which do not efficiently achieve the above, briefly described desiderata.

This invention provides an improved steering system particularly adapted for the steering of articulated vehicles wherein it is desired to provide a selectively variable fluid flow rate to the steering jacks thereof during all phases of vehicle operation. The control valve generally comprises a main valve spool slidably mounted in a housing arranged to co-operate with selectively formed variable passage means for providing a predetermined fluid flow rate to the jacks directly proportioned to spool movement. Means are provided for maintaining a predetermined pressure differential across the variable passage means. Means are also provided for communicating a relief valve chamber with a reservoir and the jacks to permit pump volume to be bypassed to the reservoir when the main spool valve is in neutral position.

In accordance with the above discussions, an object of this invention is to provide a non-complex control valve arrangement for efficiently providing an oil flow rate therethrough directly proportional to movement of a valve spool.

Another object of this invention is to provide a stable hydraulic steering system for articulated vehicles comprising a control valve arranged to efficiently subject steering jacks of the vehicle to the desired amount of fluid pressure during the various phases of vehicle operation.

A further object of this invention is to provide a control valve particularly adapted for use in a steering system for articulated vehicles comprising valve means for venting a relief valve chamber to permit pump volume to be bypassed to a reservoir when the control valve is in neutral position and to stop such venting prior to actuation of the steering jacks of the vehicle.

A still further object of this invention is to provide a control valve for use in the steering system of an articulated vehicle comprising means for creating restricted communication between the steering jacks of the vehicle and a reservoir when the control valve is in neutral position.

Further and more specific objects of this invention will become apparent from the following description when read in connection with the accompanying drawings wherein:

FIG. 1 is a schematic view disclosing a control valve integrated into a steering system for an articulated vehicle, and FIG. 2 discloses another embodiment of the control valve which may also be employed in the steering system shown in FIG. 1.

Referring to FIG. 1, a control valve generally shown at 10 is adapted to control the steering of an articulated vehicle comprising a pair of frames 11 and 12 pivotally connected at 13. Jack means in the form of a pair of hydraulic jacks 14 and 15 are pivotally mounted between the frames in a conventional manner so that extension of one jack and simultaneous retraction of the other is effective to steer the vehicle in the desired direction.

For example, should it be desired to steer the vehicle by moving frame 11 in a counter-clockwise direction about pivot 13, the valve is actuated to permit pressurized fluid to flow therethrough from pump 16 into a conduit 17 wherefrom it is transmitted to the rod end of jack 14 and the head end of jack 15. During this phase of vehicle operation, fluid is simultaneously discharged from opposite ends of the jacks and returned to a reservoir 18 by means of a second conduit 19. In a like manner, the vehicle may be steered in the opposite direction by actuating the valve so as to reverse the direction of the above described fluid flow.

Steering valve 10 comprises a valve body 21 having a main spool 22 reciprocally mounted for axial movement therein adapted to communicate an inlet port 23 with either outlet port 24 or 25 for vehicle steering purposes. Axially spaced variable passage means comprising metering slots 26 and 27 are formed in the spool to selectively permit such alternative communication depending on the direction of spool movement. A pair of slots 28 and 29 are arranged to form restricted passage portions when the valve is in the neutral position shown for purposes hereinafter explained.

It can be seen that the restriction formed by one of the metering slots 26 or 27 to communicate the pump with the jacks for steering purposes is determined by the amount the spool is moved axially relative to the valve body. Thus the rate of fluid flow therethrough is directly proportional to the extent of such movement. A land is formed on the spool between the slots and is preferably arranged to overlap a surrounding annular portion of the inlet port at a predetermined axial distance X at each end thereof. Also, the metering slots 28 and 29 are in communication with a reservoir return passage such that the area of communication is maintained by width of the slots and axial distance Y for purposes hereinafter more fully explained.

Since the output of pump 16 normally exceeds the capacity of the metering slot 26 or 27, a pressure drop is purposely created across the restriction established by one of the slots. In order that the fluid in excess of that passing through the slots may be bypassed to reservoir 18, a modulating valve means comprising a dump spool or piston 30 is provided. The piston is slidably mounted in the housing and has radial ports 31 formed therethrough arranged to communicate fluid pressure from inlet port 23 to internal wall 32 thereof. Further radial ports 33 are formed through side wall portions of the piston.

A chamber 34 is arranged in the valve body and adapted to communicate with the lower pressure of the jacks, i.e., lower relative to the inlet pressure, which lower pressure along with the pressure applied against the piston 30 by coil spring 35 counteracts the higher inlet pressure acting on wall 32. A cup-shaped retainer 36 is arranged in the chamber to aid in the precise positioning and retention of the spring. From the above description, it can thus be seen that means are provided for maintaining a predetermined pressure differential across the variable passage means when the pressure in the jack means is increased due to turning of the vehicle.

A poppet or safety valve 37 is arranged to close a passage 38 formed through the retainer under the action of coil spring 39. The fluid pressure in chamber 34 acts against the poppet valve in opposition to spring 39 so that when the pressure in the system reaches a predetermined dangerous level, valve 37 will open and vent chamber 34 to reservoir 18 by means of a passage 40 and conduit 41.

A shuttle valve means 44 is arranged to communicate either outlet port 24 or 25 with a conduit 45 and thus chamber 34 by means of conduit 46 or 47, respectively. The shuttle valve essentially comprises a spool 48 reciprocally mounted therein and is normally urged to the proper position corresponding to conditions in the circuit by pressure in jacks 14 and 15. Slotted passages 51 and 52 are suitably formed on the spool for purposes hereinafter more fully explained.

In operation, when spool 22 is manually or otherwise moved to the right, the pressurized fluid source is communicated to port 24 and is thereafter directed through conduit 46 to valve 44 and also the steering jacks. Such pressurized fluid then functions to move spool 48 in an upward direction to communicate conduit 46 with conduit 45 and chamber 34 through passage 52. This action simultaneously blocks conduit 47.

When the pressure is sufficient to impart a force to wall 32 of piston 30 which exceeds the combined forces of spring 35 and the pressure in chamber 34, piston 30 will move in a rightward direction to open and thus bypass the excess pump capacity to reservoir 18 by means of radially arranged ports 33 and conduit 41. Resistance to turning of the vehicle tends to increase the pressure in jacks 14 and 15 and consequently the pressure in port 24, conduits 46 and 45 and chamber 34. This action causes piston 30 to shift in a leftward direction to further throttle the fluid being bypassed and effectively increases the pressure in inlet port 23 a sufficient amount to provide the predetermined pressure differential and thus maintain a constant volume of fluid flow to the jacks regardless of the force required to steer the vehicle. A suitably maintained pressure differential for a particular application approximated 60 p.s.i.

When spool 22 is moved in a leftward direction, pressurized fluid is directed through outlet port 25 to the jacks and also through conduit 47 to shift spool 48 in a downward direction to communicate outlet port 25 with chamber 34 by means of conduit 47, passages 51 and conduit 45.

The pressurization of chamber 34 is slightly delayed upon shifting of spool 22 due to the time required for spool 48 to shift for communicating either conduit 46 or 47 with conduit 45. Such a delay dampens any initial surge of fluid to thus aid in providing an inherently stable system. The constructions and arrangements of slots 26, 27, 28 and 29 further aid in stabilizing the system.

Such arrangements provide that slot 28 or 29 of the vent means is closed to prevent fluid flow from chamber 34 to the reservoir prior to communication of pump 16 with the steering jacks. For example, in a particular application distance X was set at 0.070 in. and distance Y at 0.030 in. to provide that after slot 28 or 29 is closed, spool 22 must move 0.040 in. before fluid is pumped to the jack. This sequential arrangement primarily functions to reduce pressure fluctuations due to overlapping of the bypassing and steering conditions of operation which normally tends to result in an unstable steering system when used in conjunction with a conventional follow-up linkage means, schematically illustrated at 53 in FIG. 1. A typical follow-up linkage is disclosed in U.S. Patent 2,614,644 to C. A. Gustafson for a Tractor Steering Mechanism. Another example of such follow-up linkage is disclosed in our assignee's copending application entitled Hydraulic Steering Mechanism for Articulated Vehicles, filed May 21, 1962, Serial No. 199,155, now U.S. Patent No. 3,130,806.

When the control valve is maintained in the neutral condition shown in FIG. 1, fluid from chamber 34 is returned to the reservoir by means of slot 28 or 29 and the annular chamber which communicates with return conduit 41. In order to achieve this function, spool 48 is shifted in a direction communicating chamber 34 with outlet 24 or 25, whichever is at the higher pressure, by means of conduits 45 and 46 or conduits 45 and 47, respectively. Thus, pump volume may be bypassed to the reservoir from inlet port 31 by merely overcoming the combined nominal force of spring 35 and of any momentary pressure in the jacks to communicate ports 33 with the return line 41.

During travel of the machine with spool 22 in this neutral condition, unequal rolling resistance of the wheels tends to steer the vehicle by displacing fluid from jacks 14 and 15 through the restricted passage afforded by slot 28 or 29. This externally influenced steering acts through follow-up linkage 53 to shift spool 22 in a direction to close the proper one of slot 28 or 29 and lock fluid in the jacks. In this manner such unwanted steering is kept at a minimum to prevent excessive "drift" of the vehicle. In a particular application a steering angle of 0° 10' was sufficient to hydraulically lock the jacks. The relationship of axial dimensions X and Y, as previously described, prevents communication between the pump and jacks under these conditions.

The steering system embodiment disclosed in FIG. 2 is substantially similar to that disclosed in FIG. 1 with corresponding part numbers in FIG. 2 being accompanied by a prime symbol. The basic difference in the system shown in FIG. 2 is that the effective jack pressure in outlet 24' or 25' is directly communicated to chamber 34 by means of one of the axially spaced slots 61 and 62, formed in spool 22', conduit 63 and annular chamber 64. This arrangement permits piston 30' to maintain the desired pressure differential to effect smooth steering in substantially the same manner as above described.

We claim:

1. A steering system in combination with an articulated vehicle having two frames pivotally attached to each other, said system comprising hydraulic jack means arranged between the frames to pivot one frame relative to the other frame upon actuation thereof, a control valve arranged to selectively communicate a pressurized fluid source to actuate said jack means, said fluid source including a reservoir, said control valve comprising a spool reciprocally mounted therein having axially spaced variable passage means formed thereon arranged to communicate fluid to the jack means through either of said variable passage means depending upon the direction of spool movement at a rate which is directly proportional to the extent of such movement, control means, including a chamber arranged to communicate with the pressurized fluid in said jack means, for maintaining a predetermined pressure differential across the variable passage means when the pressure in said jack means is increased due to turning of the vehicle, said control means comprising vent means for venting the pressurized fluid in said chamber to said reservoir directly when said spool is in a neutral position preventing fluid flow through either of said variable passage means.

2. The invention of claim 1 wherein said spool is further arranged to provide a restricted communication between the reservoir of said pressurized fluid source and said jack means when said spool is in a neutral position.

3. The invention of claim 2 further comprising follow-up linkage means operatively connected to said spool for slightly moving said spool to prevent said restricted communication between said reservoir and said jack means when said valve is in the neutral position and said system is subjected to external steering forces.

4. The invention of claim 1 wherein said control means further comprises a reciprocally mounted piston arranged to variably bypass excess fluid to said reservoir when said piston is moved to an open position, said piston arranged to be subjected to source pressure to move it towards open position and further arranged to extend into said chamber arranged to communicate with pressure in said jack means to urge said piston to a throttling position and spring means arranged to also urge said piston to the throttling position.

5. The invention of claim 1 further comprising sequence means associated with said control valve for closing said vent means prior to movement of said spool to a position communicating said fluid source with said jack means.

6. The invention of claim 1 wherein said vent means comprises shuttle valve means arranged for communicating either of said variable passage means with said chamber and for simultaneously blocking communication between the other of said variable passage means and said chamber and further arranged for blocking fluid flow to the chamber from either of said variable passage means when said spool is moved to said neutral position.

7. The invention of claim 1 wherein said vent means comprises axially spaced slot means formed on said spool arranged to directly communicate jack pressure to said chamber depending upon the direction of spool movement.

8. A steering system comprising a control valve operatively connecting a pressurized fluid source to at least one hydraulically actuated member to regulate the fluid flow thereto, said source including a reservoir, said valve comprising a reciprocally mounted spool arranged to stop or communicate said fluid to said member through variable passage means at a flow rate determined by the extent of spool movement, regulating means for maintaining a predetermined pressure differential across said passage means to maintain a higher pressure at an inlet of said passage means than at an outlet thereof, said regulating means comprising a hollow reciprocally mounted piston arranged to be urged to open position by said pressurized fluid source to bypass fluid from said inlet to the reservoir of said fluid source through variable port means formed in a wall of said piston and further arranged to communicate with the outlet fluid pressure to urge said piston to a throttling position to maintain said pressure differential and spring means arranged to urge said piston to the throttling position.

9. The invention of claim 8 further comprising vent means for venting the pressure urging said piston to the throttling position to the reservoir of said fluid source directly when said spool is moved to close communication between said fluid source and said member.

10. The invention of claim 9 further comprising sequence means associated with said control valve for closing said vent means when said spool is moved prior to the time said spool is further moved to communicate said fluid source to said member.

11. In a steering system comprising a control valve means for selectively communicating a pressurized fluid source to a hydraulically actuated member to place it in a selected condition of operation, a modulating valve means including a chamber arranged to receive pressurized fluid from said member for modulating the fluid pressure to said member and shuttle valve means for delaying the rise of pressure in the chamber of said modulating valve means when said control valve means is actuated to place said member in its condition of operation whereby initial fluid surge to said member is dampened to thereby aid in stabilizing the steering system.

12. In a steering system comprising a control valve means for selectively communicating a pressurized fluid source to a hydraulically actuated member to place it in a selected condition of operation, said fluid source including a reservoir, a modulating valve means including a chamber arranged to receive pressurized fluid from said member for modulating the fluid pressure to said member and vent means for venting the pressurized fluid in said chamber to said reservoir directly when said control valve means is maintained in a neutral condition of operation preventing communication between said fluid source and said member.

13. The invention of claim 12 wherein said control valve means is arranged to provide a restricted communication between said reservoir and said member when said control valve means is maintained in its neutral condition of operation.

14. The invention of claim 12 further comprising sequence means associated with said control valve means for first closing said vent means upon actuation of said control valve means from its neutral condition of operation before said control valve means is further actuated to communicate said source with said member.

References Cited by the Examiner
UNITED STATES PATENTS

| | | | |
|---|---|---|---|
| 2,409,842 | 10/1946 | Eaton | 91—421 X |
| 2,501,483 | 3/1950 | Taylor | 91—421 |
| 2,614,644 | 10/1952 | Gustafson | 180—79.2 |
| 2,846,848 | 8/1958 | Coker | 180—79.2 X |
| 2,941,547 | 6/1960 | Rood | 180—79.2 |
| 3,154,921 | 11/1964 | Junck et al. | 180—79.2 X |

KENNETH H. BETTS, *Primary Examiner.*